3,787,371
CRYSTAL-CLEAR POLYAMIDES PREPARED BY CONDENSING BIS(AMINOMETHYL)-TRICYCLO-DECANE WITH AROMATIC DICARBOXYLIC ACIDS
Ludwig Brinkmann and Walter Herwig, Frankfurt am Main, Germany, assignors to Farbwerke Hoechst Aktiengesellschaft vormals Meister Lucius & Bruning, Frankfurt am Main, Germany
No Drawing. Filed Dec. 8, 1971, Ser. No. 206,137
Claims priority, application Germany, Dec. 10, 1970, P 20 60 703.8
Int. Cl. C08g 20/20
U.S. Cl. 260—78 R        6 Claims

ABSTRACT OF THE DISCLOSURE

There are disclosed and claimed novel polyamides, which are obtained by polycondensating (a) bis-(amino-methyl)-tricyclodecanes and, optionally, aliphatic diamines, cycloaliphatic diamines or araliphatic diamines, (b) aliphatic saturated or aromatic dicarboxylic acids, and, optionally, (c) aliphatic amino-carboxylic acids, and the process for making the same.

---

The present invention relates to crystal-clear polyamides.

Polyamides on the basis of aliphatic diamines and aliphatic dicarboxylic acids have been known for decades. According to their composition, these polyamides are either crystalline substances having a high melting point, or they are amorphous substances having a relatively low second order transition temperature. The crystalline aliphatic polyamides are used in the preparation of fibers and injection-moulded articles. The amorphous aliphatic polyamides are used in the injection-moulding process. However, the second order transition temperatures of these amorphous polyamides are too low for many application purposes.

The present invention provides a process for the preparation of crystal-clear polyamides by way of polycondensation of diamines, dicarboxylic acids and amino-carboxylic acids or their lactams in known manner and under common conditions, which comprises using:

(a) bis-(amino-methyl)-tricyclo-decanes of the formula

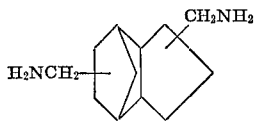

and optionally up to 50 mol percent, preferably up to 25 mol percent, calculated on the total amount of the diamine components, of aliphatic diamines containing up to 20 carbon atoms, preferably from 4 to 10 carbon atoms, or of cyclo-aliphatic diamines containing up to 20 carbon atoms, preferably from 5 to 10 carbon atoms, or of araliphatic diamines containing from 8 to 20 carbon atoms, preferably from 8 to 14 carbon atoms, (b) aliphatic saturated dicarboxylic acids containing from 5 to 20 carbon atoms, preferably from 5 to 12 carbon atoms, or aromatic dicarboxylic acids containing from 7 to 20 carbon atoms, preferably from 8 to 14 carbon atoms, in particular mononuclear dicarboxylic acids carrying the carboxylic groups in meta- or para-position, or mixtures of at least two of these aliphatic or aromatic or aliphatic and aromatic dicarboxylic acids, and optionally, (c) from 0 to 50% by weight, preferably from 0 to 25% by weight, calculated on the total weight of the poly-amide, of aliphatic amino-carboxylic acids having up to 20 carbon atoms, preferably from 4 to 12 carbon atoms, in particular ω-amino-carboxylic acids, or their lactams.

The synthesis of the diamine to be used in accordance with the invention, the preparation of which is not claimed in this patent application, is easily effected by way of an oxo-reaction of dicyclo-pentadiene with a subsequent reductive amination of the dialdehyde obtained as the intermediate product. In this process, a mixture of isomers is generally obtained, as the substitution may be effected at different positions—which can be seen easily from the formula—and besides, as there is also the possibility of the formation of stereo-isomers. For the polycondensation, the mixture may be used, or a pure form, or mixtures of different forms.

Also in the case of copolyamides which contain, besides bis-(amino-methyl)-tricyclo-decane, at least one further diamine, the bis-(amino-methyl)-tricyclo-decane causes a considerable increase of the second order transition temperature. In the case of these polycondensates, too, there is a strong hindrance of crystallization; they are therefore well suitable for being used in the preparation of transparent shaped articles. In the preparation of copolyamides the following diamines, for example, may be incorporated by condensation: 2-methyl-pentamethylene-diamine, 2,2-dimethyl-pentamethylene-diamine, hexamethylene diamine, 2-methyl-hexamethylene-diamine, 1,2-bis-(amino-methyl)-cyclobutane, 1,3-bis-(amino-methyl)-cyclohexane, 1,4-bis-(amino - methyl)-cyclohexane, or m-xylylene diamine. The composition of the diamine mixture is to be chosen in such a way that at least 50 mol percent, preferably at least 75 mol percent, calculated on the sum of the diamine components, consist of bis-(amino-methyl)-tricyclo-decane.

As dicarboxylic acids to be used according to the invention, there may be mentioned, for example: adipic acid, pimelic acid, suberic acid, azelaic acid, sebacic acid, 1,10-decane-dicarboxylic acid, cyclopentane-1,3-dicarboxylic acid, cyclohexane-1,3-dicarboxylic acid, terephthalic acid, isophthalic acid, 2,5-pyridine-dicarboxylic acid, 4,4'-diphenyl-dicarboxylic acid, 1,4-naphthalene-dicarboxylic acid, 1,5-naphthalene-dicarboxylic acid, 2,6-naphthalene-dicarboxylic acid.

Mixtures of these dicarboxylic acids may also be used. Use is made advantageously of mixtures of terephthalic acid and adipic acid, the proportion of adipic acid being preferably in the range of from 30 to 70 mol percent, calculated on the total amount of the dicarboxylic acid components.

In the preparation of the polyamides of the invention, amino-carboxylic acids may also be used. Aliphatic ω-amino-carboxylic acids are advantageously used. ε-Amino-caproic acid is particularly suitable. Further advantageous examples for aliphatic amino-carboxylic acids to be used according to the invention are amino-pivalic acid, ω-amino-caprylic acid, ω-amino-undecanoic acid, or ω-amino-dodecanoic acid. Instead of using the amino-carboxylic acids, use may also be made of their lactams. The amino-carboxylic acid(s) or the lactam(s) are used in an amount of from 0 to 50% by weight, preferably from 0 to 25% by weight, calculated on the total weight of the polyamide.

The preparation of the polyamides of the invention is effected according to known processes which have been developed for the preparation of polyhexamethylene-adipamide and poly-ε-caprolactam. The diamines, the dicarboxylic acids and, optionally, the amino-carboxylic acids or their lactams are introduced into an autoclave made of stainless steel, optionally, while adding water. It is sometimes advantageous to prepare the salts of the diamines and the dicarboxylic acids beforehand. The components are heated, while stirring, at a temperature of from about 200 to 250° C. Subsequently, the steam is let off, and the temperature is increased to about 260 to 300° C. At this temperature, the mixture is stirred for some time in a nitrogen current. Finally, the autoclave is evacuated, and the reaction mixture is further subjected to the condensation process until the polyamide has reached the desired molecular weight.

The polyamides of the invention have—according to their composition—second order transition temperatures of up to about 200° C. and reduced specific viscosities measured under the conditions specified below, which are in the range of from 1.0 to 2.5 dl./g., preferably from 1.5 to 2.0 dl./g. The shaped articles manufactured from the polyamide of the invention are marked by a high transparency, good dielectric properties and a high impact strength. The good mechanical properties of the shaped articles are maintained up to relatively high temperatures, owing to the high second order transition temperatures. The crystal-clear polyamides of the invention are suitable for the manufacture of injection-moulded articles which may also be used in the range of higher temperatures.

The following examples illustrate the preparation and the properties of the polyamides of the invention in detail. The reduced specific viscosity was determined by measuring in a 1% polyamide solution in phenol/tetrachloroethane (in a weight ratio of 60:40) at 25° C. The second order transition temperature was determined by way of differential thermo-analysis at a heating rate of 4° C. per minute.

EXAMPLE 1

4984 g. of isophthalic acid, 5830 g. of bis-(aminomethyl)-tricyclo-decane and 800 milliliters of water were introduced into an autoclave made of stainless steel and being provided with a stirrer. After the atmospheric oxygen had been eliminated by nitrogen, the reaction mixture was precondensed for 2 hours at a temperature of 240° C., while stirring, in which process the pressure was 14 kg./cm.² Subsequently the pressure was decreased to atmospheric pressure in the course of 1 hour, while the temperature was increased to 285° C. at the same time. At this temperature, the reaction mixture was stirred for 1 hour in the nitrogen current. The pressure was then reduced to 3 mm. of mercury. The melt was stirred for 30 minutes at 3 mm. of mercury and at a temperature of 285° C. A crystal-clear polyamide was obtained, which had a reduced specific viscosity of 1.72 dl./g. The second order transition temperature of the product was 199° C.

EXAMPLE 2

According to the process described in Example 1, a polyamide was prepared from 3322 g. of terephthalic acid, 2923 g. of adipic acid, 7772 g. of bis-(aminomethyl)-tricyclo-decane, and 800 milliliters of water. The crystal-clear polyamide obtained had a reduced specific viscosity of 1.74 dl./g. The second order transition temperature of the product was 153° C.

EXAMPLE 3

According to the process described in Example 1, a polyamide was prepared from 4984 g. of terephthalic acid, 5830 g. of bis-(amino-methyl)-tricyclo-decane, 2703 g. of ε-caprolactam, and 800 milliliters of water. The crystal-clear polyamide obtained had a reduced specific viscosity of 1.70 dl./g. The second order transition temperature of the product was 152° C.

What is claimed is:

1. A crystal-clear polyamide consisting essentially of the polycondensation reaction product at a temperature of 200° C. to 300° C. of a bis(aminomethyl)-tricyclodecane of the formula

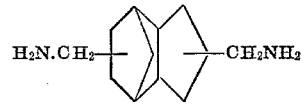

and a phthalic acid selected from isophthalic acid and terephthalic acids, said polyamide having a reduced specific viscosity of 1.0 to 2.5 dl./g.

2. A crystal-clear polyamide consisting essentially of the polycondensation reaction product at a temperature of 200° to 300° C. of a bis(aminomethyl)-tricyclodecane of the formula

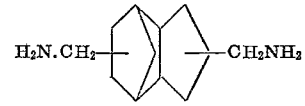

and a dicarboxylic acid which is a mixture of terephthalic acid and adipic acid containing 30 to 70 mol percent of adipic acid based on the total amount of dicarboxylic acid, said polyamide having a reduced specific viscosity of 1.0 to 2.5 dl./g.

3. A crystal-clear polyamide consisting essentially of the polycondensation reaction product at a temperature of 200° C. to 300° C. of a mixture of ε-caprolactam and a bis(aminomethyl)-tricyclodecane of the formula

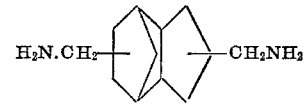

and a phthalic acid selected from isophthalic acid and terephthalic acid, said polyamide having a reduced specific viscosity of 1.0 to 2.5 dl./g.

4. A crystal-clear polyamide consisting essentially of the polycondensation reaction product of a bis(aminomethyl)-tricyclodecane of the formula

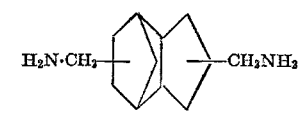

and a phthalic acid selected from isophthalic acid and terephthalic acid, said polyamide having a reduced specific viscosity of 1.0 to 2.5 dl./g.

5. A crystal-clear polyamide consisting essentially of the polycondensation reaction product of a bis(aminomethyl)-tricyclodecane of the formula

and a dicarboxylic acid which is a mixture of terephthalic acid and adipic acid containing 30 to 70 mol percent of adipic acid based on the total amount of dicarboxylic acid, said polyamide having a reduced specific viscosity of 1.0 to 2.5 dl./g.

6. A crystal-clear polyamide consisting essentially of the polycondensation reaction product of a mixture of ε-caprolactam and a bis(aminomethyl)-tricyclodecane of the formula

and a phthalic acid selected from isophthalic acid and terephthalic acid, said polyamide having a reduced specific viscosity of 1.0 to 2.5 dl./g.

References Cited

UNITED STATES PATENTS

| | | | |
|---|---|---|---|
| 2,071,250 | 2/1937 | Carothers | 260—78 A |
| 2,252,554 | 8/1941 | Carothers | 260—78 A |
| 2,252,555 | 8/1941 | Carothers | 260—78 A |
| 3,470,248 | 9/1969 | Brotherton et al. | 260—47 CBX |
| 3,686,148 | 8/1972 | Fester et al. | 260—78 TF |

FOREIGN PATENTS 1,496,956  10/1967  France.

HOWARD E. SCHAIN, Primary Examiner

U.S. Cl. X.R.

260—78 A, 78 L